US012566056B2

(12) United States Patent
Berhorst et al.

(10) Patent No.: US 12,566,056 B2
(45) Date of Patent: Mar. 3, 2026

(54) ROTARY ENCODER

(71) Applicant: HELLA GmbH & Co. KGaA,
Lippstadt (DE)

(72) Inventors: Jann Berhorst, Borchen (DE); **Sascha
Kuhlmann, Geseke (DE); Clemens
Massmann**, Wadersloh (DE)

(73) Assignee: Hella GmbH & Co. KGaA, Lippstadt
(DE)

( * ) Notice: Subject to any disclaimer, the term of this
patent is extended or adjusted under 35
U.S.C. 154(b) by 145 days.

(21) Appl. No.: 18/530,772

(22) Filed: Dec. 6, 2023

(65) Prior Publication Data

US 2024/0183647 A1     Jun. 6, 2024

(30) Foreign Application Priority Data

Dec. 6, 2022     (DE) ..................... 10 2022 132 346.3

(51) Int. Cl.
G01B 7/30          (2006.01)
G01D 5/20          (2006.01)

(52) U.S. Cl.
CPC     *G01B 7/30* (2013.01); *G01D 5/20* (2013.01)

(58) Field of Classification Search
CPC .................................... G01B 7/30; G01D 5/20
See application file for complete search history.

(56) References Cited

U.S. PATENT DOCUMENTS

| | | | | |
|---|---|---|---|---|
| 6,109,120 | A | * | 8/2000 | Robinson ........... G01D 5/34738 |
| | | | | 73/866.5 |
| 6,226,569 | B1 | * | 5/2001 | Peter ........................ G01B 7/30 |
| | | | | 701/530 |
| 6,236,199 | B1 | | 5/2001 | Irle et al. |
| 9,134,200 | B2 | | 9/2015 | Waite et al. |
| 9,719,783 | B2 | | 8/2017 | Bartscht et al. |
| 11,316,418 | B2 | * | 4/2022 | Arnstein ............ G01D 5/24442 |
| 2007/0246290 | A1 | * | 10/2007 | Deshmukh .............. G01L 3/104 |
| | | | | 180/446 |
| 2011/0234208 | A1 | * | 9/2011 | Hofmockel .......... G01D 11/245 |
| | | | | 324/207.2 |

(Continued)

FOREIGN PATENT DOCUMENTS

DE          19738836 A1     3/1999
DE          102005060519 A1     6/2007

(Continued)

*Primary Examiner* — Reena Aurora
(74) *Attorney, Agent, or Firm* — Muncy, Geissler, Olds &
Lowe, P.C.

(57)          ABSTRACT

A rotary encoder for a motor vehicle, construction machinery, agricultural machinery or special machinery, at least having a rotor with a rotor element mounted on it in a torsionally resistant manner, a sensor unit designed to determine an angular position of the rotor element, and a housing, wherein the sensor unit is mounted in the housing and the rotor is rotatably mounted on the housing, wherein the rotor element is arranged in a nominal position relative to the sensor unit, in such a way that a rotational movement of the rotor can be detected via the sensor unit. The rotor is designed in several parts and comprises a rotor carrier as well as a torsionally resistant rotor adapter mounted thereon, wherein the rotor carrier is mounted on the housing in a rotatable manner, and wherein the rotor element is torsionally mounted on the rotor carrier.

7 Claims, 4 Drawing Sheets

(56)         References Cited

U.S. PATENT DOCUMENTS

2017/0067755 A1 *   3/2017   Tsuda ................... H05K 1/0269

FOREIGN PATENT DOCUMENTS

| DE | 102007034099 | A1 | 1/2009 |
|----|--------------|----|--------|
| DE | 102014206363 | A1 | 10/2015 |
| DE | 102018217283 | A1 | 4/2020 |
| DE | 112013004077 | T5 | 11/2022 |
| EP | 2870434 | B1 | 8/2018 |

* cited by examiner

ROTARY ENCODER

This nonprovisional application claims priority under 35 U.S.C. § 119(a) to German Patent Application No. 10 2022 132 346.3, which was filed in Germany on Dec. 6, 2022, and which is herein incorporated by reference.

BACKGROUND OF THE INVENTION

Field of the Invention

The present invention relates to a rotary encoder for a motor vehicle, construction machinery, agricultural machinery or special machinery.

Description of the Background Art

Rotary encoders are sensors for rotation angles and are used to measure rotational or displacement movements of two components relative to each other. Rotary encoders are used in a wide range of applications in motor vehicles, construction and agricultural machinery or special machines, for example to determine a contact arm position, a pedal position or the tilt angle of an excavator bucket.

For example, EP 2 870 434 B1, which corresponds to US 2015/0185005, which is incorporated herein by reference, discloses a level sensor for a motor vehicle comprising a housing, a rotor rotatably mounted on the housing and a printed circuit board at least partially enclosed by the housing, comprising a stator in the form of conductor track structures, wherein the housing has an externally molded cylinder with a circular cross-section, wherein the rotor has a rotor structure, which is arranged on the outside of the rotor and corresponds to the stator, wherein the rotor is rotatably guided and locked in the cylinder.

In order to qualify for operational use, rotary encoders must be subjected to various functional tests, such as a force test, a pull-off test of the mechanical connections, or a leak test against ingress of media. Due to the large number of applications for rotary encoders, they are manufactured in various designs that are configured for the respective application, wherein the dimensions and interfaces for connection to external components vary regularly. Any such embodiment must pass the tests necessary for qualification, which in practice entails a disadvantageously high outlay.

SUMMARY OF THE INVENTION

It is therefore an object of the present invention to provide an alternative design of a rotary encoder for a motor vehicle, construction machinery, agricultural machinery or special machinery, etc., wherein particularly a simple configurability is to be taken into account conceptually.

The invention is based on a rotary encoder, which has at least one rotor with a torsionally resistant rotor element attached to it, a sensor unit designed to determine an angular position of the rotor element, and a housing, wherein the sensor unit is mounted in the housing and the rotor is rotatably mounted on the housing, wherein the rotor element is arranged in a nominal position relative to the sensor unit, in such a way that a rotational movement of the rotor can be detected via the sensor unit. According to the invention, the rotor is designed in several parts and comprises a rotor carrier as well as a torsionally resistant rotor adapter attached to it, wherein the rotor carrier is rotatably mounted on the housing, and wherein the rotor element is torsionally mounted on the rotor carrier.

The invention is based on the idea of constructing the rotary encoder in such a modular way that the housing, the sensor unit and the rotor carrier including the rotor element form a central qualified unit that provides the sensor function and also fulfills all other requirements for operation, and which forms an individually configured rotary encoder by connecting a rotor adapter of largely arbitrarily shape and dimension. The rotor adapter is the interface between the rotary encoder and a component of, for example, a motor vehicle, such as a control arm in the chassis. The effort required to qualify the rotary encoder, in particular with regard to the sensory functionality, the mechanical load capacity and the tightness, is limited to the testing of a central unit when using the modular concept of the invention and therefore does not have to be carried out anew for each configuration of the rotary encoder.

Preferably, the rotor adapter can be attached to the rotor carrier via a snap-fit connection. Snap-fit connections are constructed by spring-loaded spreading of at least one joining partner, i.e., via elastic deformation and spring-back to form a positive fit. For example, the rotor adapter has elastically bendable arms with locking lugs at the end, which are spring-loaded and spread into corresponding mounts on the rotor carrier.

The rotor carrier can have a bush-shaped receiving section in which a corresponding connecting section of the rotor adapter is included. In particular, the receiving section of the rotor carrier and the connecting section of the rotor adapter each have an essentially cylindrical contour, wherein the receiving section is hollow cylindrical and forms a receptacle space for the connecting section.

For example, the rotor adapter can have a radially protruding rotor arm, an axially protruding pin or a bush-shaped form. As a result, for example, different interfaces are formed for connecting the rotor with a component of a motor vehicle, for example, wherein the concept of a modular rotary encoder according to the invention allows for an arbitrary variety of concrete embodiments of the rotor adapter. For example, the protruding rotor arm has a length of 30-120 mm, and a connector is located at the distal end of the rotor arm, such as a hole to receive a screw or bolt.

The rotary encoder can comprise a housing seat, wherein the housing is attached to the housing seat via a snap-fit connection. The housing seat represents the stator-side interface of the rotary encoder for connection to a component of a motor vehicle, for example. Depending on the specific application, the housing seat can be largely arbitrarily shaped and dimensioned and can have a suitable number and arrangement of connectors, such as holes.

Furthermore, the rotary encoder can comprise, for example, a plug socket, wherein the plug socket is attached to the housing via a snap-fit connection, and wherein the rotary encoder comprises an electrical contact through which an at least indirect electrical connection is formed between the sensor unit and the plug socket. The plug socket forms the supply and data interface for controlling and reading the sensor unit. The plug socket can be individually configured for each specific application of the rotary encoder.

With regard to the measuring principle for detecting the angular position of the rotor element relative to the stator, i.e., relative to the sensor unit, the rotary encoder according to the invention can realize different embodiments. In particular, the sensor unit is designed as an array of planar excitation and receiver coils on a sensor circuit board, and the rotor element exhibits metallic conductivity. The resulting inductive angle sensor is known from the document DE 197 38 836 A1, which corresponds to U.S. Pat. No. 6,236, 199, which is herein incorporated by reference. It describes an inductive angle sensor with a stator element, which has an excitation coil subjected to a periodic alternating voltage as well as several receiving coils, and with a rotor element, which specifies the strength of the inductive coupling between excitation coil and receiving coils as a function of its angular position relative to the stator element, and with an evaluation circuit for determining the angular position of the rotor element relative to the stator element from the voltage signals induced in the receiving coils, wherein the rotor element forms at least one short-circuit line, which, at least over partial areas, forms a periodically repeating loop structure in the circumferential direction of the rotor element. Such an inductive angle sensor is characterized, among other things, by a compact design, a high achievable resolution and a particularly high insensitivity to manufacturing and installation tolerances.

Alternatively, the sensor unit can be designed as a Hall sensor or as a magnetoresistive sensor, wherein the rotor element can be made of a magnetic material. The measuring principle of the rotary encoder is then based on the detection of a change in the magnetic flux during a rotational movement of the magnetic rotor element.

The rotary encoder can also comprise an output circuit board that is designed to process and output measurement signals that can be generated by the magnetic field sensor. Via the output circuit board, the rotary encoder can be configured for a specific application in such a way that the signals transmitted via the data interface have a desired format.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1A:
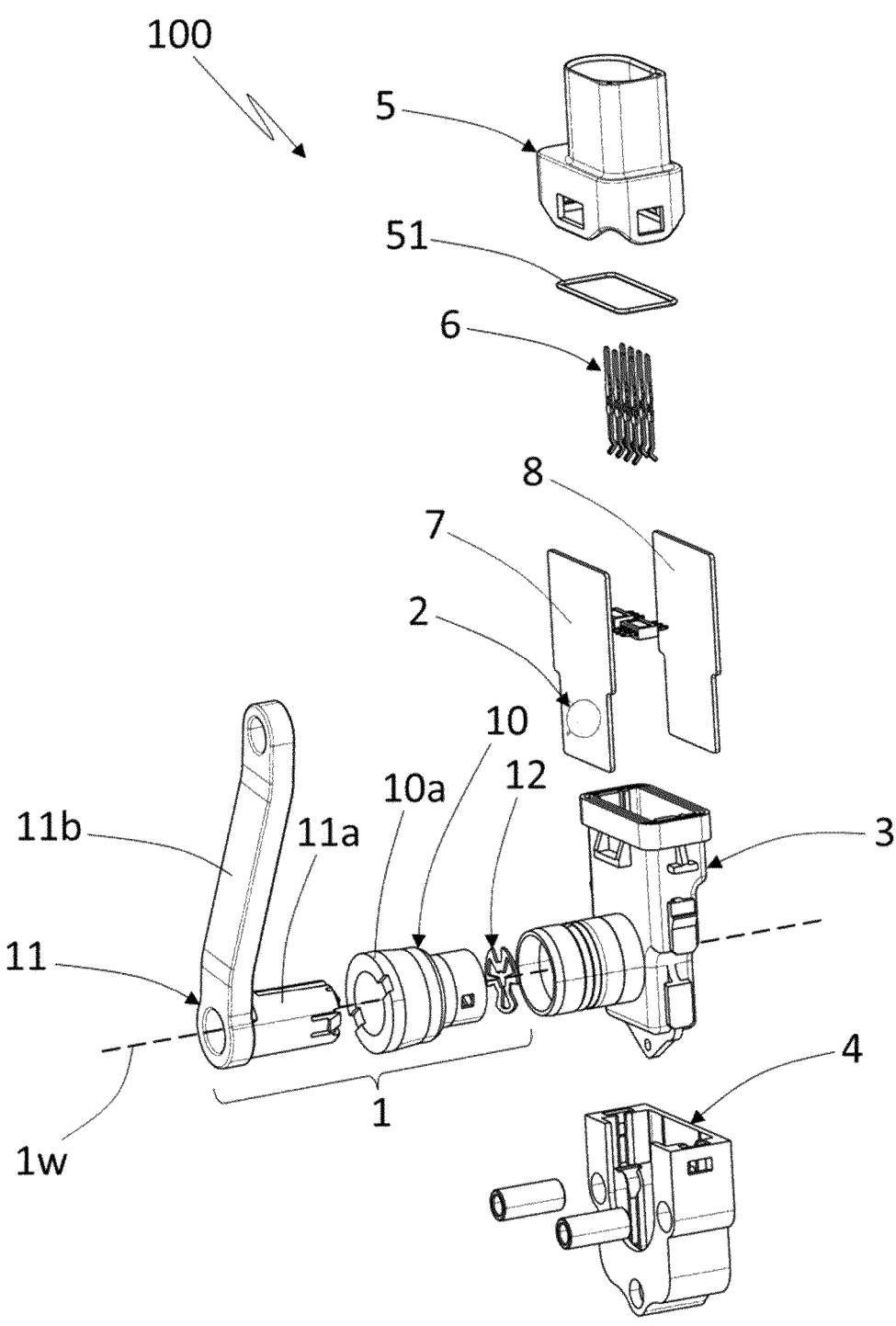
FIG. 1a: shows an exploded view in isometric view of an example of the rotary encoder according to the invention.
Figures 1B, 1C, 1D, 1E:
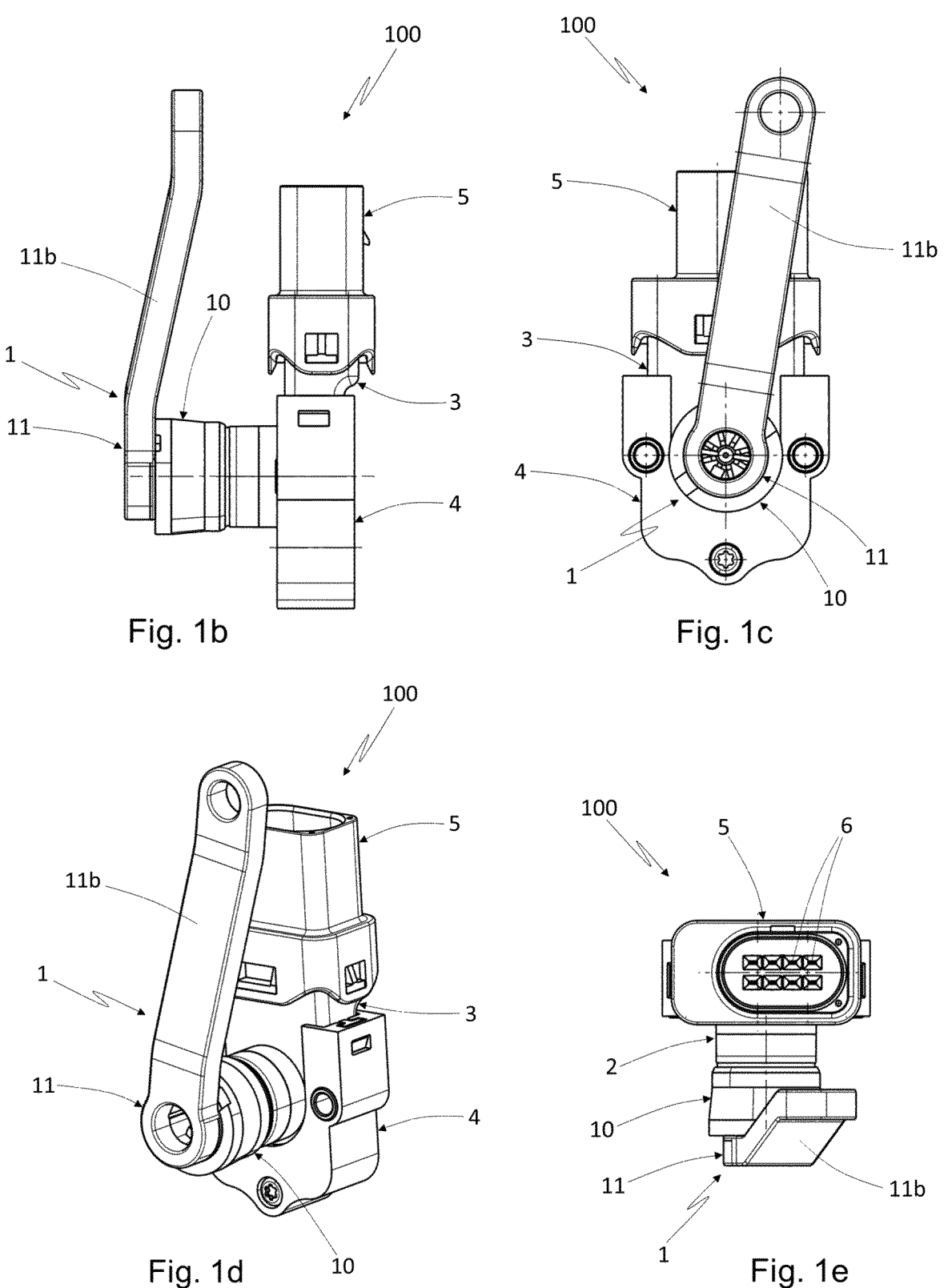
FIG. 1b: shows a side view of the example in FIG. 1a, FIG. 1c: shows a frontal view of the example in FIG. 1a, FIG. 1d: shows an isometric view of the example in FIG. 1a, FIG. 1e: shows a top view of the example in FIG. 1a, FIG. 2: shows an exploded view in isometric view of an example of the rotary encoder according to the invention.

FIG. 1a-FIG. 1e shows an example of the rotary encoder 100 according to the invention in different views. The rotary encoder 100 comprises the rotor 1 with the rotor element 12 attached to it in a torsionally resistant manner, the sensor unit 2 for determining an angular position of the rotor element 12 and the housing 3, wherein the sensor unit 2 is mounted in the housing 3 and the rotor 1 is rotatably mounted on the housing 3 about the rotor rotation axis 1w, wherein the rotor element 12 is arranged in a nominal position relative to the sensor unit 2, in such a way that a rotational movement of the rotor 1 can be detected via the sensor unit 2. According to the invention, the rotor 1 is designed in several parts and comprises the rotor carrier 10 as well as the rotor adapter 11, which is mounted on it in a torsionally resistant manner, wherein the rotor carrier 10 is mounted on the housing 3 in a rotatable manner, and wherein the rotor element 12 is mounted in a torsionally resistant manner on the rotor carrier 10.

The rotor carrier 10 is mounted in a hollow cylindrical molding of the housing 3, wherein the rotor element 12 is mounted on the front side of the rotor carrier 10 in a torsionally resistant manner, for example overmolded by injection molding in the course of the production of the rotor carrier 10. The rotor element 12 exhibits a metallic conductivity. The sensor unit 2 is designed as an arrangement of a planar excitation coil and planar receiver coils on the sensor circuit board 7. By applying an alternating voltage to the excitation coil, eddy currents are induced in the rotor element 12, and the resulting anisotropic variation of the magnetic excitation field can be detected via the receiver coil and can be assigned to an angular position of the rotor element 12 and thus to a position of the rotor 1. The operating principle and the basic structure of the sensor unit 2 and the rotor element 12 are disclosed in the document DE 197 38 836 A1, which—as noted above—corresponds to U.S. Pat. No. 6,236,199, and which are herein incorporated by reference.

The rotor carrier 10 together with the rotor element 12, the sensor unit 2 on the sensor circuit board 7 and the housing 3 form the central unit of the rotary encoder 100 according to the invention, which can be modularly assembled by combining it with the other components to form an individual embodiment for a specific application, for example in a motor vehicle.

In the present case, the rotor adapter 11 is an example of the radially protruding rotor arm 11b, the distal end of which has a hole for connection with an external component. The rotor adapter 11 is torsionally resistant via a snap-fit connection on the rotor carrier 10, wherein the rotor carrier 10 has the bushing-shaped receiving section 10a, in which the corresponding connecting section 11a of the rotor adapter 11 is mounted. Two elastically flexible arms with terminal locking lugs are formed on the connecting section 11a, which are spring-loaded and spread in the interior of the receiving section 10a to form a snap-fit connection.

As a stator-side interface to a component of a motor vehicle, for example, the rotary encoder 100 has the housing seat 4, wherein the housing 3 is attached to the housing seat 4 via a snap-fit connection.

Furthermore, the rotary encoder 100 includes the plug socket 5, which is also attached to the housing 3 via a snap-fit connection. An electrical connection is formed between the sensor unit 2 and the plug socket 5 via the electrical contact 6 in the form of spoon contacts running in the plug socket 5, which also includes the output circuit board 8, which is designed for the processing and output of measurement signals that can be generated by the sensor unit 2. Via the sealant 51, the housing is sealed 3 on the plug side.

Figure 2:
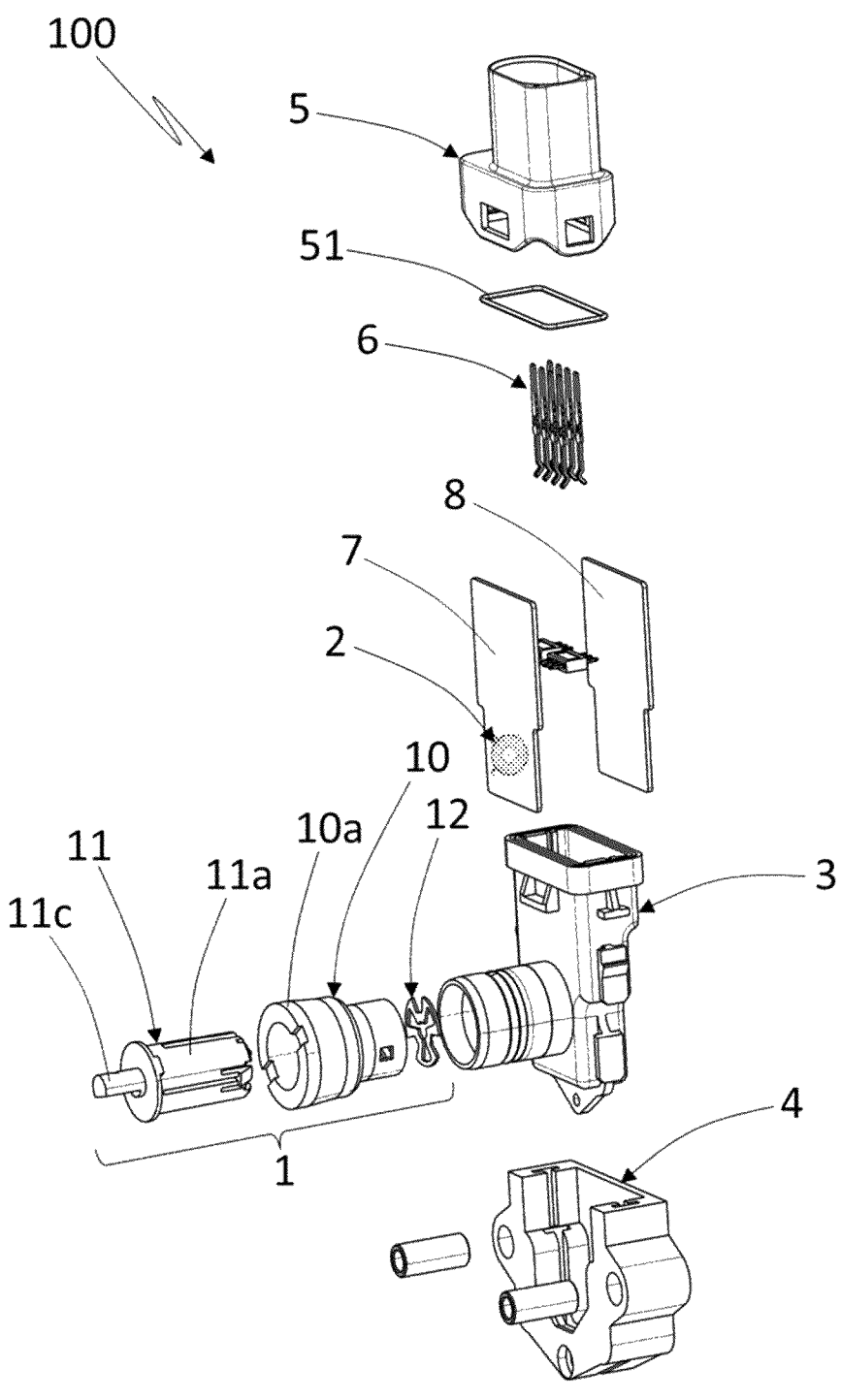
Figure 3:
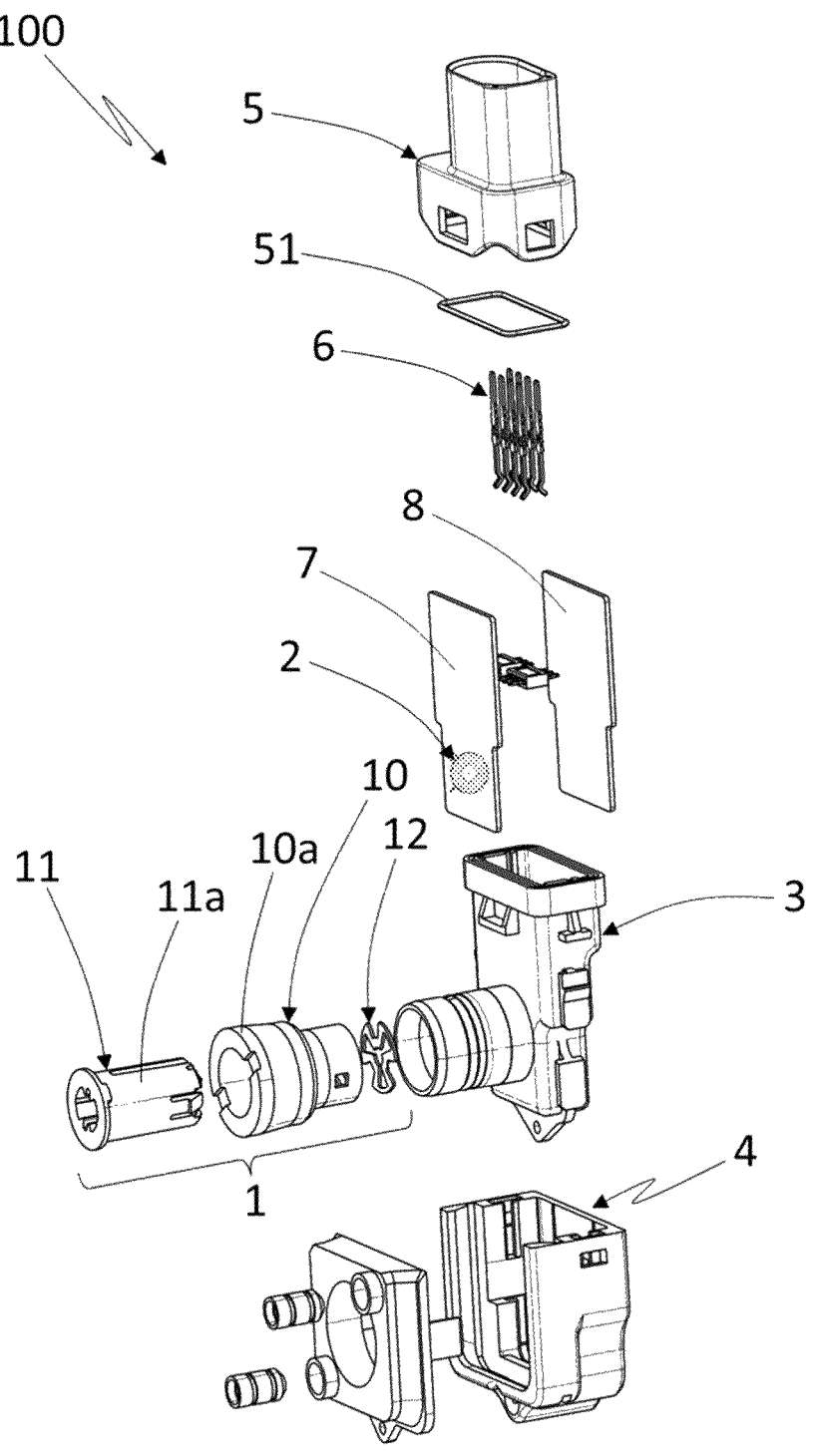
FIG. 3: shows an exploded view in isometric view of an example of the rotary encoder according to the invention.

FIG. 2 and FIG. 3 show further examples of the rotary encoder 100 according to the invention, which differ from the first embodiment described above only in the design of the interfaces, i.e., of the rotor adapter 11 and the housing seat 4. For example, in FIG. 2, the rotor adapter 11 has the axially protruding pin 11*c*, and in FIG. 3, the rotor adapter 11 is bush-shaped. Furthermore, the rotary encoder 100 in FIG. 3 has a two-part housing seat 4.

The invention is not limited in its execution to the preferred embodiment given above. Rather, a number of variants are conceivable, which makes use of the solution presented even in the case of fundamentally different designs. All features and/or advantages arising from the claims, description or drawings, including design details and spatial arrangements, may be essential to the invention either on their own or in a wide variety of combinations The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A rotary encoder for a vehicle, a motor vehicle, construction machinery, agricultural machinery or special machinery, the rotary encoder comprising:

a rotor with a torsionally resistant rotor element;

a sensor unit to determine an angular position of the rotor element; and a housing, the sensor unit being mounted in the housing and the rotor being mounted on the housing in a rotatable manner, wherein the rotor element is arranged in a nominal position relative to the sensor unit such that a rotational movement of the rotor is detected by the sensor unit, wherein the rotor is formed in several parts and comprises a rotor carrier and a rotor adapter attached to the rotor carrier in a torsionally resistant manner, wherein the rotor carrier is mounted on the housing in a rotatable manner, such that the rotor carrier is rotatable relative to the housing,

wherein the rotor element is mounted torsionally resistant on the rotor carrier, wherein the rotor adapter is attached to the rotor carrier by a snap-fit connection, and wherein the rotor carrier has a bush-shaped receiving section in which a corresponding connecting section of the rotor adapter is received, such that the connecting section of the rotor adapter is inserted inside of the receiving section of the rotor carrier to form the snap-fit connection.

2. The rotary encoder according to claim 1, wherein the rotor adapter has a radially protruding rotor arm, an axially protruding pin, or a bush-shaped form.

3. The rotary encoder according to claim 1, wherein the rotary encoder comprises a housing seat, and wherein the housing is attached to the housing seat by a snap-fit connection.

4. The rotary encoder according to claim 1, wherein the rotary encoder comprises a plug socket, wherein the plug socket is attached to the housing by a snap-fit connection, and wherein the rotary encoder comprises an electrical contact via which an at least indirect electrical connection is formed between the sensor unit and the plug socket.

5. The rotary encoder according to claim 1, wherein the sensor unit is formed as an arrangement of planar excitation and receiver coils on a sensor circuit board, as a Hall sensor, or as a magnetoresistive sensor.

6. The rotary encoder according to claim 1, wherein the rotary encoder comprises an output circuit board that processes and outputs measurement signals that are generated by the sensor unit.

7. The rotary encoder according to claim 1, wherein the connecting section of the rotor adapter has flexible arms with locking lugs, such that when the connecting section is inserted inside of the receiving section of the rotor carrier, the locking lugs form the snap-fit connection with an interior of the receiving section of the rotor carrier.

* * * * *